(12) United States Patent
Fishman

(10) Patent No.: US 7,849,409 B2
(45) Date of Patent: Dec. 7, 2010

(54) SYSTEM AND METHOD FOR TRANSFERRING WEB-BASED INFORMATION

(75) Inventor: Daniel Fishman, Newtonville, MA (US)

(73) Assignee: ACCESS Systems Americas, Inc., Sunnyvale, CA (US)

(*) Notice: Subject to any disclaimer, the term of this patent is extended or adjusted under 35 U.S.C. 154(b) by 2200 days.

(21) Appl. No.: 09/871,990

(22) Filed: May 31, 2001

(65) Prior Publication Data
US 2002/0180776 A1 Dec. 5, 2002

(51) Int. Cl.
*G06F 3/00* (2006.01)

(52) U.S. Cl. .................. 715/745; 715/739; 709/246

(58) Field of Classification Search .......... 345/739, 345/745; 709/246
See application file for complete search history.

(56) References Cited

U.S. PATENT DOCUMENTS

| | | | | | |
|---|---|---|---|---|---|
| 5,608,874 | A | * | 3/1997 | Ogawa et al. | 709/246 |
| 5,701,423 | A | * | 12/1997 | Crozier | 345/762 |
| 5,727,202 | A | | 3/1998 | Kucala | 395/610 |
| 5,774,867 | A | | 6/1998 | Fitzpatrick et al. | 705/8 |
| 5,960,406 | A | | 9/1999 | Rasansky et al. | 705/9 |
| 6,000,000 | A | | 12/1999 | Hawkins et al. | 707/201 |
| 6,101,480 | A | | 8/2000 | Conmy et al. | 705/9 |
| 6,216,110 | B1 | | 4/2001 | Silverberg | 705/9 |
| 6,269,341 | B1 | | 7/2001 | Redcay, Jr. | 705/8 |
| 6,313,852 | B1 | | 11/2001 | Ishizaki et al. | 345/751 |
| 6,339,795 | B1 | * | 1/2002 | Narurkar et al. | 709/246 |
| 6,366,915 | B1 | | 4/2002 | Rubert et al. | 707/10 |
| 6,405,225 | B1 | | 6/2002 | Apfel et al. | 707/526 |
| 6,577,622 | B1 | | 6/2003 | Schuster et al. | 370/352 |
| 6,624,831 | B1 | * | 9/2003 | Shahine et al. | 345/815 |
| 6,636,240 | B1 | * | 10/2003 | Centerwall et al. | 345/752 |
| 6,648,370 | B2 | | 11/2003 | Fu et al. | 705/8 |
| 6,654,800 | B1 | | 11/2003 | Rieger, III | 709/223 |
| 6,675,356 | B1 | | 1/2004 | Adler et al. | 715/530 |

OTHER PUBLICATIONS

Microsoft Computer Dictionary, 2002, Microsoft Press, Fifth Edition, p. 404.*

* cited by examiner

*Primary Examiner*—Dennis Bonshock
(74) *Attorney, Agent, or Firm*—Sunstein Kann Murphy & Timbers LLP

(57) ABSTRACT

A method for transferring Web-based information over a network to a personal information management system includes selecting a set of Web-based information and creating a transfer request. The transfer request includes the set of Web-based information and an address for a server associated with the personal information management system. The server is in communication with the network and has access to calendar and contact data for a set of users. The transfer request is sent to the server and the set of Web-based information is stored at the server and associated with at least one user from the set of users.

16 Claims, 5 Drawing Sheets

SYSTEM AND METHOD FOR TRANSFERRING WEB-BASED INFORMATION

TECHNICAL FIELD

The present invention relates to systems and methods for personal information management, in particular, transferring Web-based information to a personal information management system over a communication network, in particular, the Internet.

BACKGROUND ART

Personal information managers ("PIMs") and are well known in the prior art. PIMs are software applications that are designed to help users organize information such as, for example, calendars or schedules, dates, lists, reminders and contacts and may be implemented on a personal computer or on a personal digital assistant ("PDA"). In addition, PIM's may be implemented as Web sites on the World Wide Web.

SUMMARY OF THE INVENTION

In accordance with one aspect of the invention, a method of transferring Web-based information over a network to a personal information management system having calendar and contact data for a set of users includes selecting a set of Web-based information and creating a transfer request that includes at least the set of Web-based information and an address for a server associated with the personal information management system and in communication with the network. The transfer request is sent to the server where the server has access to the calendar and contact data for the set of users. The set of Web-based information is then stored at the server and associated with at least one user in the set of users. The transfer request may be a hypertext transfer protocol (HTTP) request and the network may be the Internet. The Web-based information may be stored in a database in communication with the server.

In one embodiment, the set of Web-based information is contact information and is stored with the contact data for the at least one user. In another embodiment, the Web-based information is an event and is stored with the calendar data for the at least one user. The Web-based information may be located on the network using a Web browser. In a preferred embodiment, the transfer request is created using a toolbar inserted into the Web browser.

The method may further include sending a response from the server to the Web browser to indicate that the set of Web-based information has been transferred to the personal information management system. The Web-based information may be selected by highlighting information displayed by the Web browser. In a further embodiment, the toolbar includes a link to create the transfer request to transfer the set of Web-based information.

In accordance with another aspect of the invention, a system for transferring Web-based information over a network to a personal information management system having calendar and contact data for a set of users includes a toolbar inserted into a Web browser. The Web browser is used to search for and display Web-based information. A user may locate and select a set of Web-based information from the information displayed by the Web browser. The system further includes a link, included in the toolbar, to create a transfer request that includes at least the set of Web-based information selected by the user. The transfer request directs the set of Web-based information to the personal information management system when the link is selected by the user. The transfer request is received by at least one server coupled to the network. The server stores the Web-based information that is associated with the user.

In one embodiment, the transfer request is a hypertext transfer protocol (HTTP) request. The Web-based information may be stored in a database in communication with the server. In a further embodiment, the set of Web-based information is contact information and is stored with the contact data for the user. In another embodiment, the set of Web-based information is an event and is stored with the calendar data for the user.

Further embodiments of the invention are implemented as a computer program product having a computer useable medium with computer readable program code thereon. The computer readable program code may be read and utilized by the computer system in accordance with conventional processes.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Definitions.

As used in this description and the accompanying claims, the following terms shall have the meanings indicated, unless the context otherwise requires:

"Web-based information" means information available on the World Wide Web.

A PIM or personal information management system typically includes, among other things, a calendar and contact (or address) list for each user of the system. The calendar may include events such as appointments, concerts, birthdays, meetings, etc. and the contact list may include data such as names, addresses, phone numbers, etc. PIM's may be implemented as Web sites on the World Wide Web. For more information regarding a Web-based PIM, see co-pending patent application Ser. No. 09/498,516, filed Feb. 2, 2000, and co-pending patent application Ser. No. 09/693,543, filed Oct. 20, 2000, which applications are herein incorporated by reference. Generally, a user may directly add information, such as an event or contact, to their calendar or contact list by accessing the PIM on the World Wide Web. However, when a user locates information they wish to include in their PIM elsewhere on the World Wide Web, the user is required to access their PIM, and thereby leave the location (or Web page) on the World Wide Web they are currently at, in order to add the information.

Figure 1:
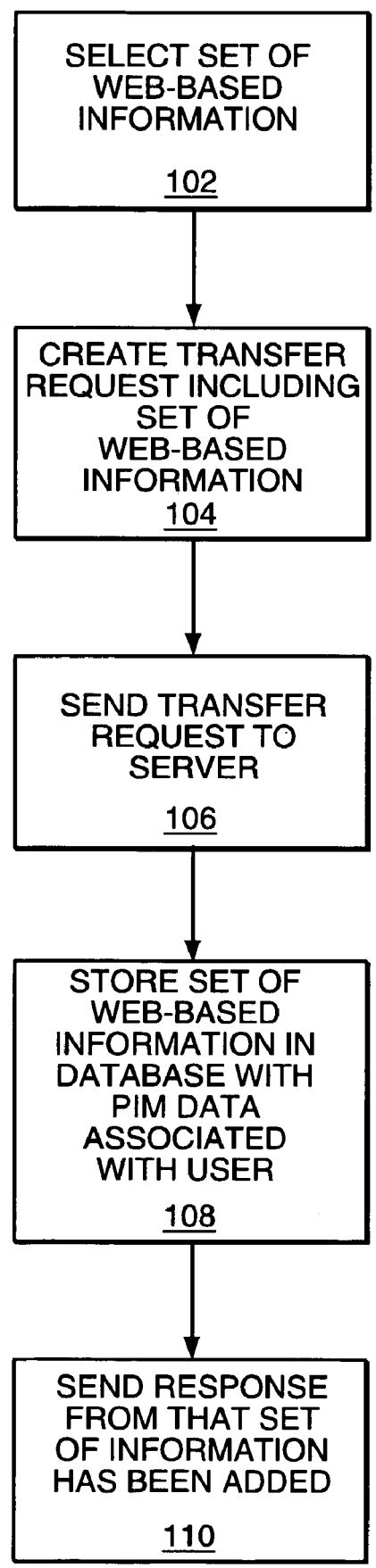
FIG. 1 is a block diagram of the logical flow of a method for transferring Web-based information to a personal information management system in accordance with an embodiment of the invention.

FIG. 1 is a block diagram of the logical flow of a method for transferring Web-based information to a personal information management system in accordance with an embodiment of the invention. At block 102, a user selects a set of Web-based information that should be added to their PIM. For example, the user may select an address to add to their contact list or an event to add to their calendar. The user may select the information by, for example, highlighting the set of information to be added to the personal information management system. A user may locate, display and interact with information on the World Wide Web using a Web browser. The set of Web-based information may be, for example, a contact or an event such as a concert.

Once the set of Web-based information has been selected, a transfer request is created that includes the set of Web-based information at block 104. For example, an HTTP (hypertext transfer protocol) request may be created that includes set of Web-based information to be transferred to the personal information management system. In order to create the transfer request, the set of Web-based information is parsed using parsing methods known in the art. In a preferred embodiment, a toolbar is inserted (or plugged-in) into the Web browser and includes a link to create the transfer request including the set of Web-based information when the link is selected by the user.

The transfer request, including the set of Web-based information, is then sent to a server that has access to the user's calendar and contact data associated with the PIM at block 106. The calendar and contact data may be stored in a database in communication with the server. At block 108, the sever stores the set of Web-based information contained in the transfer request with the calendar and contact data associated with the user in the database.

When the transfer request is sent to the server, the server will need to access the user's calendar and contact data. If the user is registered with the personal information management system, a cookie may be created by the Web browser so that the browser may login to the system without requiring any action by the user. A cookie is a mechanism known in the art that allows the Web browser to store information about the user. If the Web browser does not have a cookie with the users' login information, the user will be presented with a request for login information. Once the user provides the requested login information, the server may access the user's calendar and contact data. While the set of Web-based information is transferred to the PIM, the user will advantageously remain at the location on the Web where the set of Web-based information was found and may the continue searching the Web. If the user is not registered with the personal information management system, the user will be presented with a request to register. When the user has registered with the system, a calendar and address list will automatically be created for the user and stored in the database.

At block 110, when the set of Web-based information has been added to the user's calendar and contact data, a response is sent from the server to the toolbar at the Web browser to indicate that the set of Web-based information has been added. For example, a light may appear on the toolbar, or an additional window may appear to indicate a successful addition of the set of Web-based information.

In a further embodiment, the user may add the set of Web-based information to a handheld device such as a personal digital assistant (PDA) or cellular telephone. In one embodiment, the handheld device may be a PDA such as the Palm m505 or Palm VIIx provided by Palm, Inc. of Santa Clara, Calif. The user's calendar and contact data stored in the database at the server may be added to calendar and contact data on a PDA using synchronization methods known in the art. The PDA may synchronize with the calendar and contact data using a wired connection or through wireless communication for a wireless device.

Figure 2:
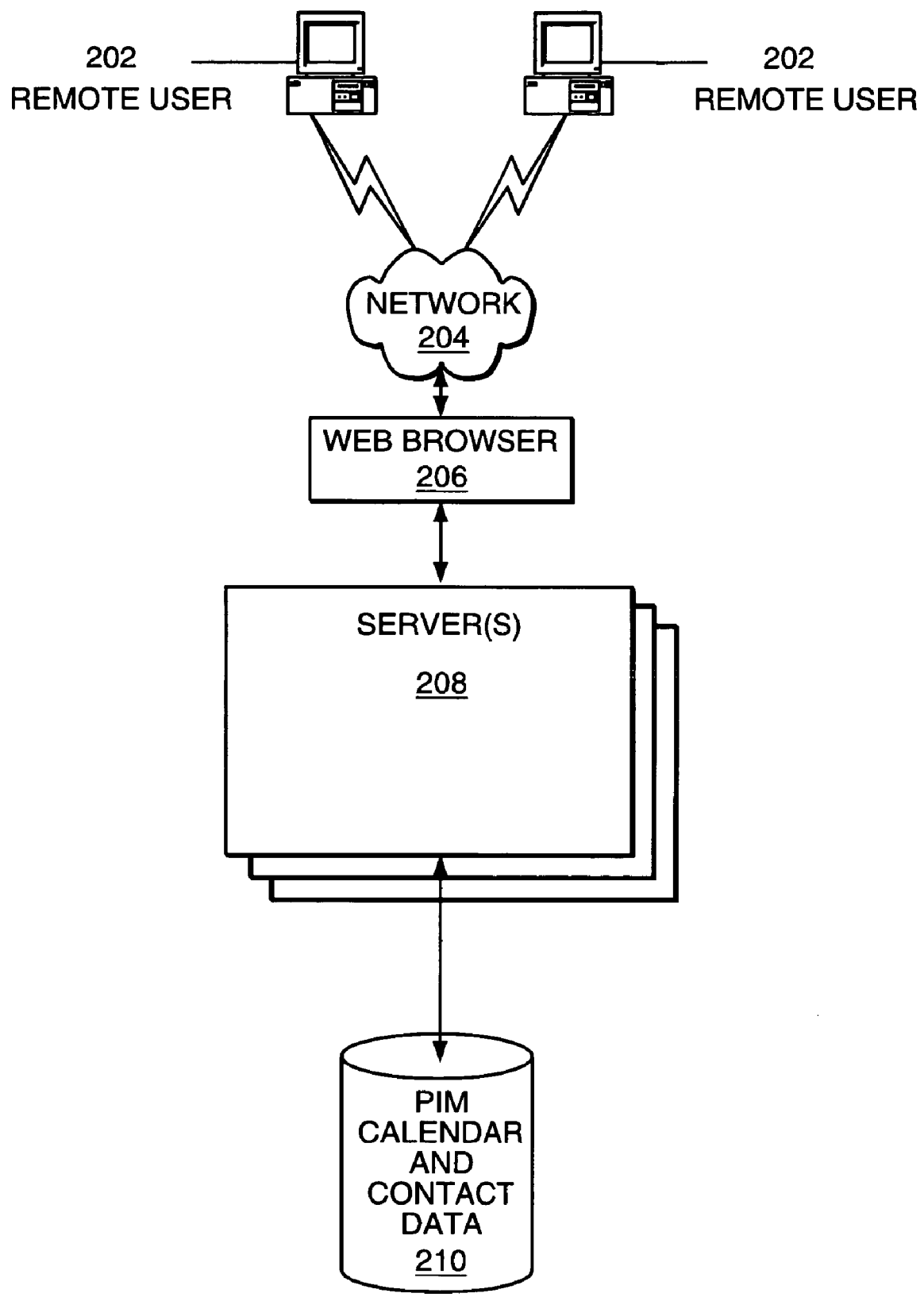
FIG. 2 is a block diagram of a system for transferring Web-based information to a personal information management system in accordance with an embodiment of the invention.

FIG. 2 is a block diagram of a system for transferring Web-based information to a personal information management system in accordance with an embodiment of the invention. A user may access the World Wide Web, including a personal information management system, via a remote computer 202 which is in communication over a network 204 with a plurality of servers 208. The network 204 may be implemented as the Internet, in particular, the World Wide Web. Multiple users 202 may access and communicate over the system. The servers 208 are in communication with a database that stores, among other things, the calendar and contact data of the PIM. The servers 208 may also be in communication with other databases that store the content for Web sites accessible on the World Wide Web. Accordingly, the user may access the personal information management system as well as other information via sites on the World Wide Web. A user may use a Web browser 206 to locate, display and interact with the information on the web sites on World Wide Web.

Figure 3:
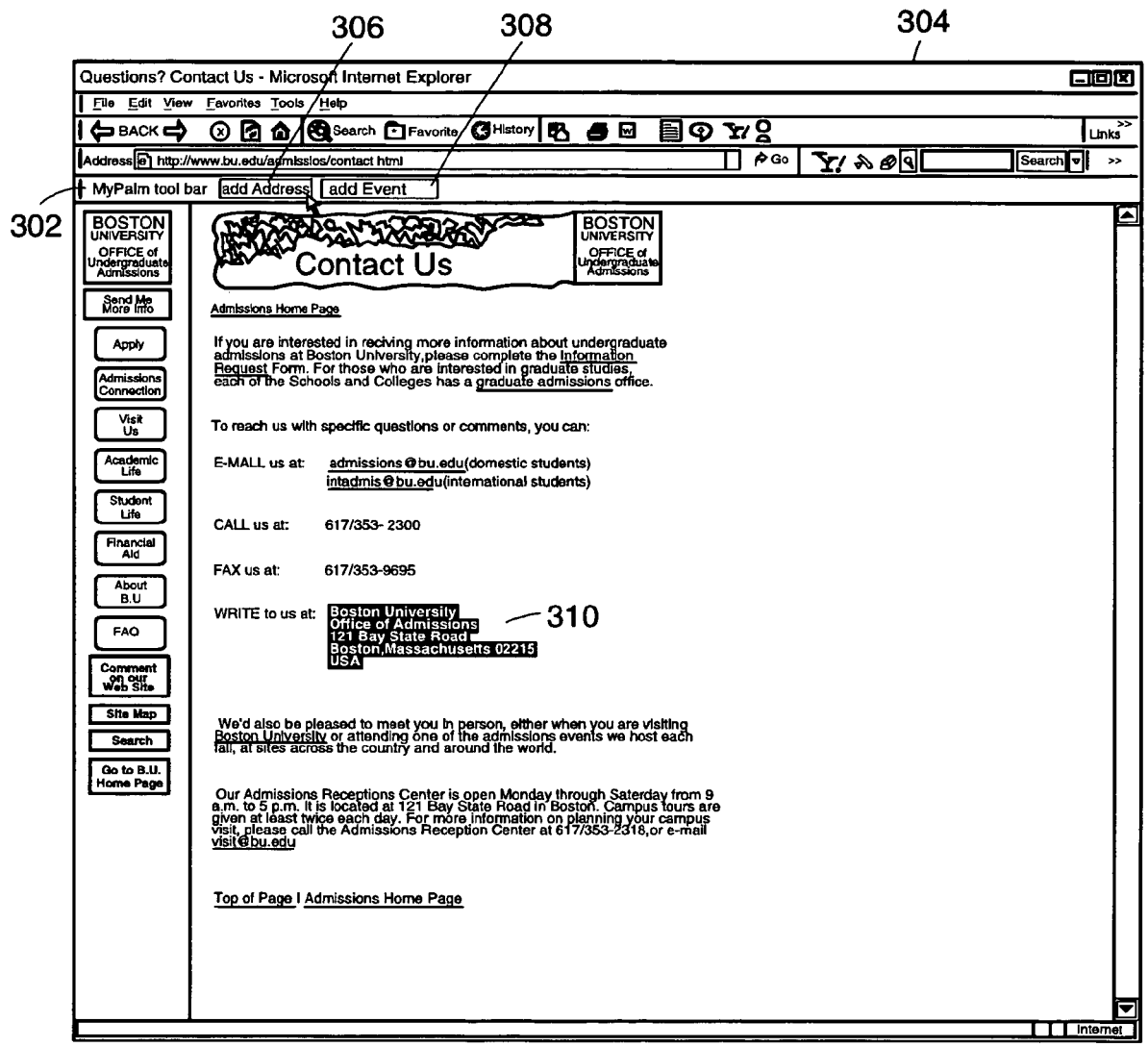
FIG. 3 shows an exemplary Web browser including a toolbar for transferring Web-based information in accordance with an embodiment of the invention.

FIG. 3 shows an exemplary Web browser including a toolbar for transferring Web-based information to a personal information management system in accordance with an embodiment of the invention. In FIG. 3, a toolbar 302 is inserted (or plugged-in) into a Web browser 304 utilized by the user to search and view information on the World Wide Web. Toolbar 302 includes an add address link 306 and an add event link 308. The add address link 306 and the add event link 308 are used to add information selected by the user, either an event or an address, to calendar and contact data associated with the user in a personal information management system. As shown in FIG. 3, a user has selected contact information 310, in this example, a company name and address. The contact information 310 is selected by, for example, highlighting the information using methods known in the art.

The user may then select the add address link 306, which appears as a graphical button in the toolbar in FIG. 3, to transfer the address information to the user's contact data stored at a server associated with the PIM. The add address link 306 creates a transfer request including the contact information 310. Preferably, the transfer request is a HTTP request and may also include an address of a server associated with the PIM. The transfer request is sent to the server 208 (as shown FIG. 2), while the user continues to view the Web page from which the contact information 310 was selected. The selected contact information 310 is parsed to create the transfer request using parsing methods known in the art. The user may also select a set of information relating to an event and use the add event link 308 to add the event to the user's calendar data.

Returning to FIG. 2, when the server 208 receives the transfer request from the toolbar, the server 208 will determine whether the user is logged in to the personal information management system. If the Web browser 206 includes a cookie with the user's login information, the server 208 will use the cookie information to log in to the system and add the selected information to the user's calendar and contact data stored in the database 210. If the Web browser 206 does not include a cookie with the users login information or if the user is not registered with the system, the user will be prompted to login and/or register with the personal information management system.

Figure 5:
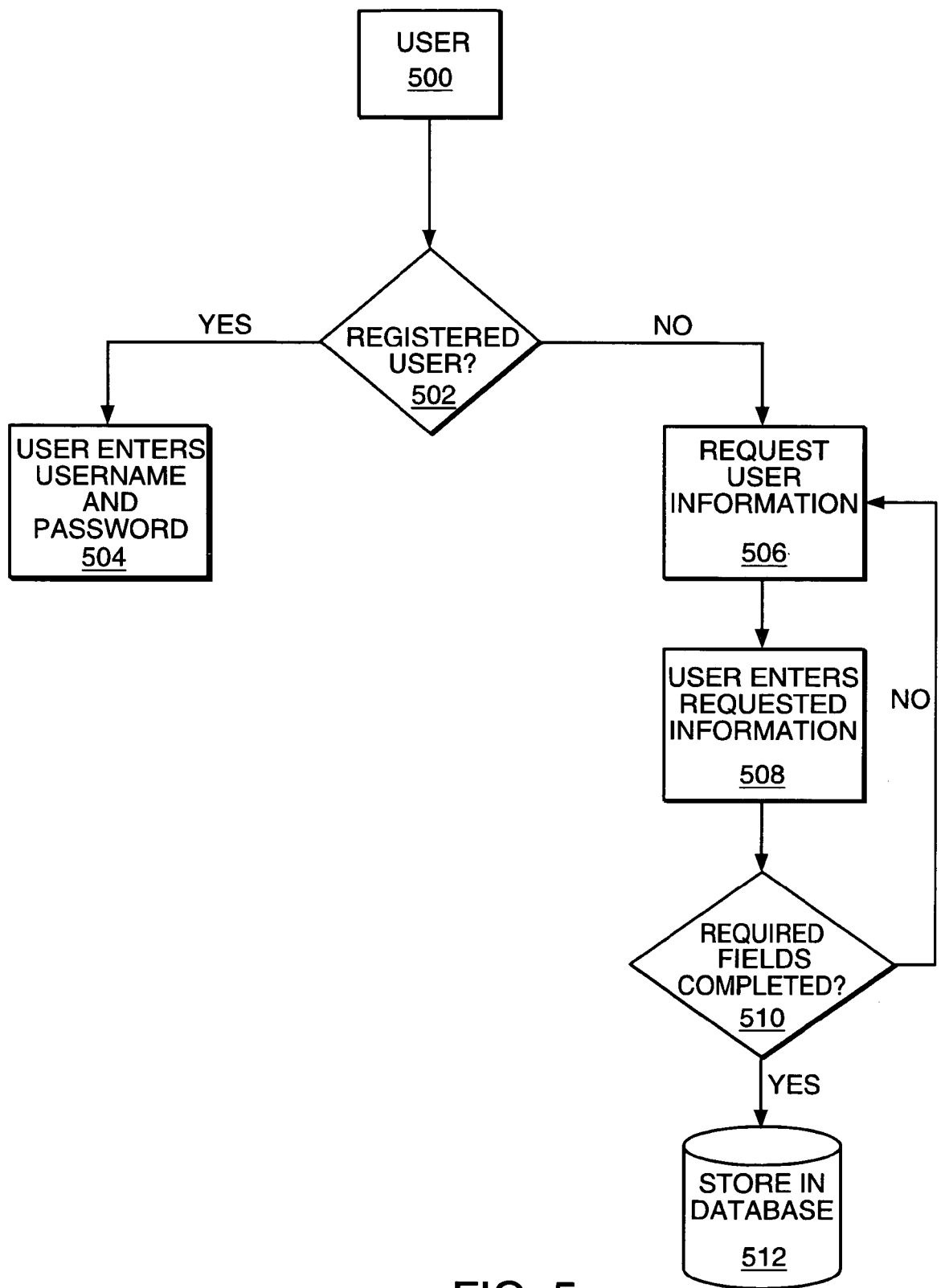
FIG. 5 illustrates the logical flow of a user registration process in accordance with the embodiment of FIG. 2.

FIG. 5 illustrates the logical flow of a user registration process in accordance with an embodiment of the invention. At bock 500, the user is presented with a Web page requesting login or registration information. If the user is a registered user at block 502, then the user will enter their username and password at block 504 to login to the personal information management system. If the user is not a registered user at block 502, the system begins a user registration process at block 506 by requesting registration information from the user. At block 508, the user will provide information such as a name and e-mail address as well as a password and username chosen by the user. If all of the required fields as completed at block 510, then a user account including the information provided by the user is stored in the database at block 512. If the required information is not provided at block 510, then the user registration process will prompt the user for the required information again at block 506.

Figure 4:
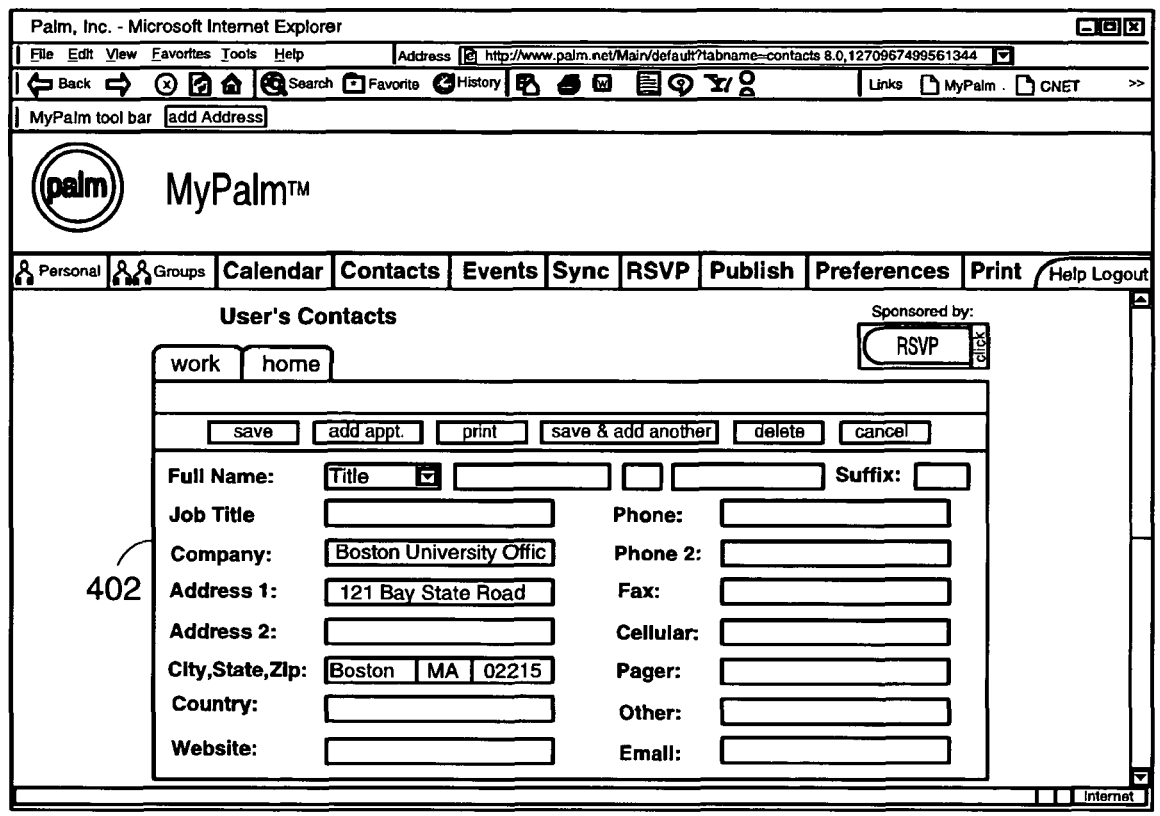
FIG. 4 shows an exemplary contact entry in a personal information management system in accordance with an embodiment of the invention.

Once the server is able to login to the personal information management system, the server may access the user's calendar and contact data. At this point, however, the user has advantageously not entered the personal information management system Web site, and remains at a location on the Web browser where the user may continue searching the Web for information. After the set of Web-based information is transferred to the PIM, the user may view the transferred information by accessing the PIM. FIG. 4 shows an exemplary contact entry in a personal information management system in accordance with an embodiment of the invention. Once the user logs in to the PIM, the user may view contact data 402, including the data transferred using the method and system described above. In a further embodiment, as discussed above, the user may add the set of Web-based information to a handheld device such as a PDA. The user's calendar and contact data stored in the database at the server may be added to calendar and contact data on a PDA using synchronization methods known in the art. The PDA may synchronize with the calendar and contact data using a wired connection or through wireless communication for a wireless device.

Alternative embodiments of the invention may be implemented as a computer program product for use with a computer system. Such implementation may include a series of computer instructions fixed either on a tangible medium, such as a computer readable media (e.g., a diskette, CD-ROM, ROM or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). the series of computer instructions preferably embodies all or part of the functionality described herein with respect to the system. Those skilled in the art should appreciate that such computer instructions can be written in a number of programming languages for use with may computer architectures or operating systems. Furthermore, such instructions may be stored in any memory device, such as a semiconductor, magnetic, optical or other memory devices, and may be transmitted using any communications technology, such as optical, infrared, microwave or other transmission technologies. It is expected such a computer program product may be distributed as a removable computer program product with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A method for transferring Web-based information over a network to a personal information management system having calendar and contact data for a set of users, the method comprising:

permitting a user to select the Web-based information on a Web page viewable in a Web browser;

permitting the user to use a toolbar associated with the Web browser, the toolbar having a plurality of indicators for identifying an information type such type being selectable from a group including address and event, associated with the Web-based information so that the user can make an identification of the information type;

receiving the user's identification made via the toolbar of the type of information;

creating a transfer request that includes at least the Web-based information and an address for a server associated with the personal information management system and in communication with the network, such request being created in response to such type identification;

sending the transfer request to the server, the server having access to the calendar and contact data for the set of users; and storing the Web-based information at the server, the Web-based information associated with at least one user in the set of users, in accordance with the type identification.

2. A method according to claim 1, wherein the transfer request is a hypertext transfer protocol request.

3. A method according to claim 2, wherein the Web-based information is event information and the Web-based information is stored with the calendar data for the at least one user.

4. A method according to claim 1, wherein the Web-based information is stored in a database in communication with the server.

5. A method according to claim 1, wherein the network is the Internet.

6. A method according to claim 1, wherein the Web-based information is contact information and the Web-based information is stored with the contact data for the at least one user.

7. The method according to claim 1, further including sending a response from the server to the Web browser to indicate that the Web-based information has been transferred to the personal information management system.

8. The A method of according to claim 7, further including presenting a confirming indicator on the toolbar, the confirming indicator confirming transfer of Web-based information to the personal information management system.

9. A method according to claim 1, wherein the Web-based information is selected by the user by highlighting information displayed by the Web browser.

10. A method according to claim 1, wherein user-interaction with one of the selected indicators also initiates transfer of the Web-based information.

11. A system for transferring Web-based information over a network to a personal information management system having calendar and contact data for a set of users, the system comprising:

- a first process running on a server responsive to user interaction;
- a Web browser in communication with the first process over the network, wherein the Web browser permits a user to select the Web-based information on a Web page viewable in the web browser;
- a toolbar associated with the a Web browser, the toolbar having a plurality of indicators for identifying an information type, such type being selectable from a group including address and event, associated with the Web-based information, the toolbar permitting the user to make an identification of the information type; such first process receiving the user's identification made with the toolbar of the type of information;
- a second process in communication with the first process, for creating a transfer request that directs the Web-based information to the personal information management system based on the information type selected by the user;
- a third process, in communication with the second process, for sending the transfer request to a server; and
- at least one server, coupled to the network, to receive the transfer request and store the selected Web-based information, in a storage location associated with the user.

12. A system according to claim 11, wherein the transfer request is a hypertext transfer protocol request.

13. A system according to claim 11, wherein the Web-based information is stored in a database in communication with the at least one server.

14. A system according to claim 11, wherein the Web-based information is contact information and the set of Web-based information is stored with the contact data for the user.

15. A system according to claim 11, wherein the Web-based information is an event and the Web-based information is stored with the calendar data for the user.

16. A system according to claim 11, wherein the Web-based information is selected by highlighting information displayed by the browser.

* * * * *